United States Patent
Huther

(10) Patent No.: US 7,901,175 B2
(45) Date of Patent: Mar. 8, 2011

(54) LOAD ARM FOR A LOW LIFT INDUSTRIAL TRUCK

(75) Inventor: Sebastian Huther, Kaltenkirchen (DE)

(73) Assignee: Jungheinrich Aktiengesellschaft, Hamburg (DE)

(*) Notice: Subject to any disclaimer, the term of this patent is extended or adjusted under 35 U.S.C. 154(b) by 697 days.

(21) Appl. No.: 11/843,838

(22) Filed: Aug. 23, 2007

(65) Prior Publication Data
US 2008/0050214 A1 Feb. 28, 2008

(30) Foreign Application Priority Data
Aug. 24, 2006 (DE) .......................... 10 2006 039 758

(51) Int. Cl.
*B66C 3/00* (2006.01)
(52) U.S. Cl. ...... 414/785; 414/629; 414/631; 280/43.12; 254/2 B; 254/2 C; 187/237
(58) Field of Classification Search .............. 414/785, 414/631, 629; 280/43.12; 254/2 B, 2 C; 187/237; 72/379.2
See application file for complete search history.

(56) References Cited

U.S. PATENT DOCUMENTS

| | | | | |
|---|---|---|---|---|
| 3,243,194 A | * | 3/1966 | Trusock | 280/43.12 |
| 3,260,534 A | * | 7/1966 | Knights | 280/43.12 |
| D447,612 S | * | 9/2001 | Niebuhr | D34/34 |

FOREIGN PATENT DOCUMENTS

| | | |
|---|---|---|
| DE | 42 09 861 A1 | 9/1993 |
| DE | 42 09 863 A1 | 9/1993 |
| DE | 197 42 190 A1 | 3/1999 |
| DE | 102 21 311 A1 | 12/2003 |
| DE | 103 21 076 B4 | 10/2005 |
| EP | 0 562 484 A1 | 3/1993 |
| EP | 1 362 761 A2 | 5/2003 |

* cited by examiner

*Primary Examiner* — Michael S Lowe
(74) *Attorney, Agent, or Firm* — Vidas, Arrett & Steinkraus

(57) ABSTRACT

A load arm for a fork of a low lift industrial truck, with an arm frame which is approximately U- or C-shaped in cross section with upward pointing bridge and downward pointing legs and an arm tip, which is connected to the arm frame via a welding connection, wherein the arm tip, tapered towards the free end, has bearing openings for the bearing of a load roller and introduction and withdrawal surfaces on the lower side, which ascend or fall off, respectively, towards the free end of the arm tip with respect to the lower edges or brims of the arm frame, and wherein the arm tip has an abutting surface at the rear end, which abuts against the blunt end of the arm frame, wherein the arm tip is formed by an integral piece of cast material, the arm tip has arm sections on the end facing the arm frame, which extend below the associated edges or brims of the arm frame and sit snugly on the lower edges or brims of the arm frame when arm frame and arm tip cling together, and the withdrawal surfaces are provided on the lower side of the arm sections.

2 Claims, 3 Drawing Sheets

LOAD ARM FOR A LOW LIFT INDUSTRIAL TRUCK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

As is known, low lift industrial trucks have two parallel spaced load arms, which are attached to the drive part of the low lift industrial truck in a suitable manner and which can be lifted with respect to the ground with the aid of a lifting cylinder and a rod assembly. Load wheels are bearing mounted on the ends of the load arms, namely in a rocker on which a drag- or presser rod inside of the load arms acts, in order to pivot the load wheels with respect to the arms, when the lifting cylinder lifts the load arms. Such a low lift industrial truck has become known from DE 197 42 190, the entire contents of which is incorporated herein by reference, for instance.

From the cited state of the art, it is also known to form the arm tip of the load arms separately. The arm frame is usually formed as a U- or C-shaped cross-sectional profile, and is either integrally canted from sheet metal or composed of metal sheets welded together with each other. The free ends of the frames are blunt, and the arm tips have abutting surfaces in order to be put against the blunt surfaces of the arm frames. In the known case, the frames are also made from steel sheets. In addition, an attachment piece made from cast metal is provided for the mounting of a load roller, which is welded together with the load arm tip and with the frame.

The present invention is based on the objective to provide a load arm for a low lift industrial truck which can be produced with minimum expense of material at concomitant small strain of the welding joint. Moreover, the arm tip should be adaptable to different load arm profiles.

BRIEF SUMMARY OF THE INVENTION

In the load arm according to the present invention, the arm tip is formed by an integral piece of cast material. The arm tip has arm sections on the end facing the arm frame, which extend below the associated edges or brims of the arm frame when arm tip and arm frame cling together, and which are welded together with the lower edges or brims of the arm frame. The withdrawal surfaces are provided on the lower side of the arm sections.

Load arms for the mentioned application have usually facilitating parts for introduction and withdrawal, mostly in the form of lower surfaces, which run in a ramp-like manner. The introduction facilitating parts are formed by surfaces ascending towards the free end of the arm tips, and the withdrawal facilitating parts by surfaces falling off towards the free end of the arm tips, wherein the introduction and withdrawal surfaces have a distance in the longitudinal direction from each other. In the known case, the surfaces for introduction as well as those for withdrawal are formed on the separate arm tips, through which the same become relatively long. Moreover, the bearing of the load rollers is relatively far apart from the welding positions, through which a not irrelevant moment is exerted on the same.

In contrary to this, in the present invention the withdrawal surfaces are formed on the arm sections, which sit snugly against the lower side of the edges or brims of the load arms. As a consequence, the withdrawal surfaces are below the frame. Thus, the length of the arm tips can be significantly reduced. The bearing openings for bearing the load rollers or the rockers for the load rollers can therefore be positioned very near to the abutting location between arm tip and load arm frame. As a consequence, the strain on the welding position between frame and arm tip is relatively small.

Even the expense of material is minimum in the load arm according to the present invention, because the arm tip is to be provided as an integral single assembly part, which is made of cast steel, for instance.

According to one embodiment of the invention, it is provided that the lower side of the arm sections runs approximately horizontal in the region of the abutting location of arm frame and arm tip, and ascends ramp-like towards the free end of the arm sections and towards the lower edge or the lower brim of the arm frame. In fact, the arm sections reduce the distance of the lower edges of the load arms from the ground; however, the load wheels keep the load arms in a sufficiently great distance from the ground in the lowered condition, so that this does not play any role.

In the welded realization of the arm frame, the lower edges of the arm frame have a width which corresponds to the thickness of the used metal sheets. Therefore it is advantageous according to one embodiment of the invention when the arm sections are approximately as wide as the lower edges or brims of the arm frame. When the load arm is canted from a metal sheet blank, the cross section is approximately C-shaped. In this case, the lower brims of the arm frame are wider than the width of the arm sections.

The arm tip forms an abutting surface at the rear end, which abuts against the blunt front end of the arm frame. It is advantageous when the abutting surfaces to be welded together are approximately congruent, in order to permit an effective welding connection which is capable to receive corresponding load moments. Outside the region of the abutting location, the wall of the arm tip, which is also U-shaped in its cross section, can be realized to be thinner than the wall thickness of the arm frame, for instance.

In order to permit effective welding together of the arm sections with the lower brim or the lower edge, respectively, of the arm frame, a further embodiment of the present invention provides that the arm sections have high areas between the ends, the planar upper sides of which sit snugly against the lower edges or brims, respectively, of the arm frame.

In order to obtain better force transmission between arm tip and arm frame, a further embodiment of the present invention provides that the abutting surface of the arm tip is formed by a chamfer, which is formed in that angular lugs are formed on the rear end of the arm tip in extension of the side walls of the arm frame, the upper and side surfaces of which are offset towards the inside with respect to the outer upper surface and the outer side surfaces of the arm tip, and which sit snugly against the inner surfaces of the arm frame, which is thrusted over the lugs sitting snugly to the chamfers. A welding of the arm tips on the frame takes place essentially in the region of the chamfers as well as in the abutting region between a section of the lower brim and the lug. In particular, the mentioned embodiment applies to arm frames the cross section of which is C-shaped. These are manufactured as so-called moulded articles, i.e. from a single-piece metal sheet blank, which is correspondingly bent.

BRIEF DESCRIPTION OF THE SEVERAL VIEWS OF THE DRAWINGS

Examples of the realization of the present invention are explained in more detail by means of drawings in the following.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
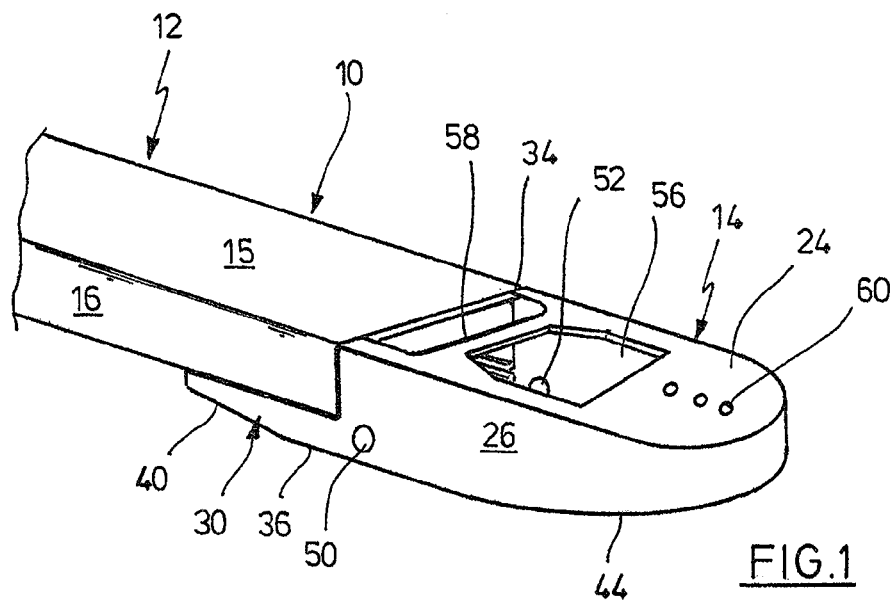
FIG. 1 shows a first embodiment of a load arm according to the present invention in a perspective view, seen from the topside.
Figure 2:
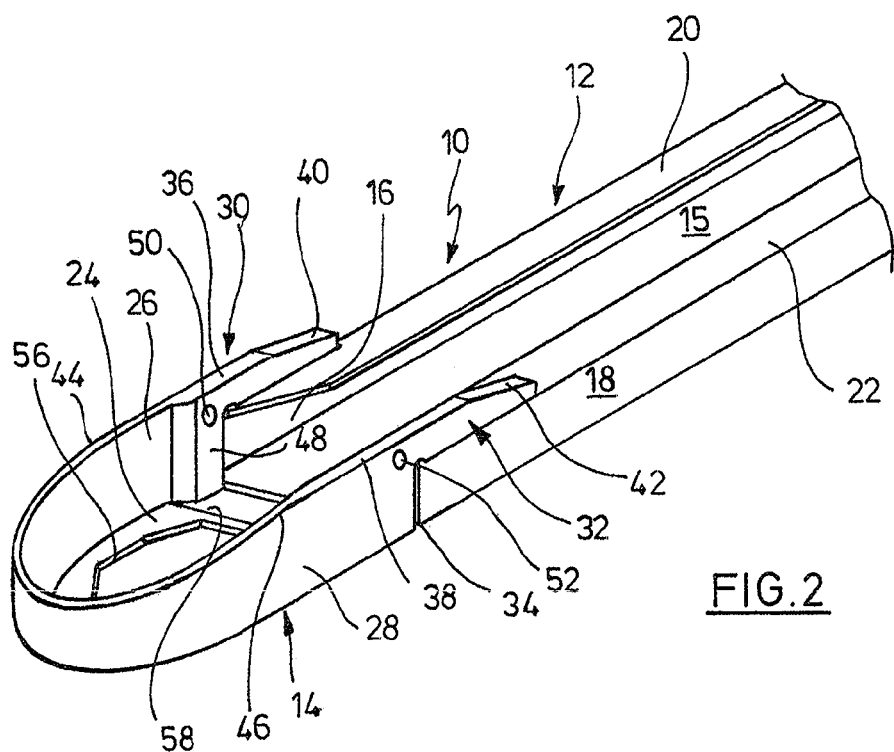
FIG. 2 shows the load arm after FIG. 1 in a perspective view, seen from the lower side.

In FIGS. 1 and 2, the front end of the load arm 10 for a low lift industrial truck is shown. The low lift industrial truck itself and the mounting of the load arm 10 are not shown. Both are extensively known in the state of the art.

The load arm 10 has an arm frame 12 and an arm tip 14. The arm frame 12 is C-shaped, as results from FIG. 2 in particular, with an upper bridge 15, two legs 16, 18 standing downward and brims 20, 22 bent off towards the inside on the lower side of the legs 16, 18. The free front end of the arm frame 12 is blunt.

The arm tip 14 has approximately a U-profile as its cross section, with an upper wall 24 and side walls 26, 28, wherein the side walls 26, 28 run towards the free end, being rounded into each other. The upper side of the upper wall 24, which is in the same height as the upper side of the bridge 15 in the region of an abutting location 34 between arm tip 14 and arm frame 12, falls somewhat down towards the free end of the arm tip 14.

On the rear end facing the arm frame 12, the arm tip 14 is provided with arm sections 30, 32, which extend below the brims 20, 22. Their outer side is aligned with the outer side of the wall sections 26, 28 in the region of the abutting location 34 between frame 12 and arm tip 14. Through this, the outer side of the arm sections 30, 32 is also aligned with the outer side of the legs 16, 18 of the frame 12. As can be recognized, the lower side of the arm sections 30, 32 is approximately horizontal or parallel, respectively, to the lower side of the brims 20, 22 on both sides of the abutting location, as is indicated at 36 and 38, respectively. Towards the frame 12, the lower side of the arm sections 30, 32 falls down with ramp-shaped surfaces 40, 42. On the other side of the abutting location 34, the lower side of the arm tip 14 ascends in a ramp-like manner, as can be seen at 44 and 46, respectively. Thus, the arm tip 14 is provided on the free end with less height than in the rear region. Moreover, the arm tip tapers sideways towards the free end, so that an introduction tip is formed for the simple introduction into palettes for instance, as is per se usual in load arms. Therefore, the ramp-shaped surfaces 44, 46 constitute a facilitating part for introduction. The other way, the ramp surfaces 40, 42 constitute a facilitating part for withdrawal when withdrawing the load arm out of a palette.

The arm sections 30, 32 are formed on thickened inner side wall sections of the arm tip 14, one of which can be recognized at 48. These form abutting surfaces together with the upper wall 24 of the arm tip 14, which are approximately congruent to the end surfaces of the frame 12 for effective welding together of these two parts.

Near the abutting location 34, the arm tip 14 has bearing openings 50, 52 for bearing a rocker, which on its parts mounts a load roller. Such a construction is commonly known.

The upper wall 24 of the arm tip 14 has a first recess 56, into which the not shown load roller projects. A further recess 58 on the upper side 24 is open towards the abutting surface of the frame 12.

Three openings 60 are formed in the upper wall 24 on the side of the recess 56 opposite to the recess 48, for installation of an introduction roller on the load arm 10, for instance.

Figure 3:
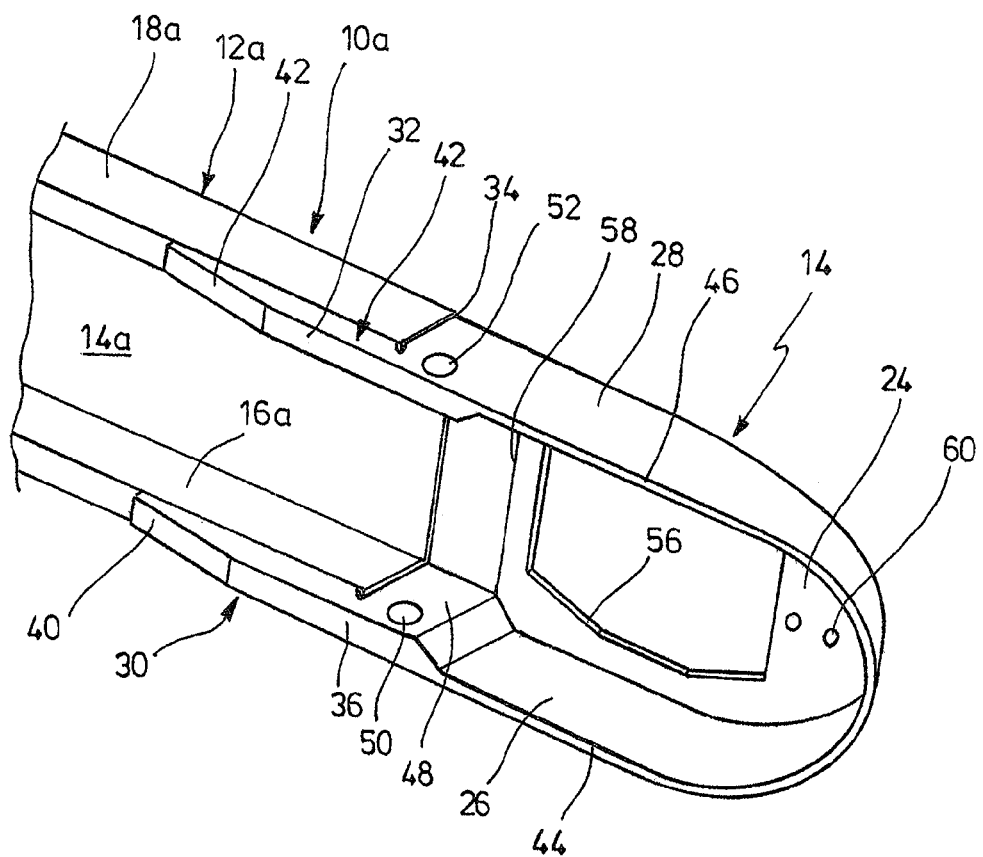
FIG. 3 shows a second embodiment of a load arm according to the present invention in a perspective view, seen from the lower side.

In the embodiment after FIG. 3, the arm tip 14 is identical to that one of FIG. 1 and 2. Therefore, the same reference signs are used. However, an arm frame 12a is different, which is U-shaped in its section with a bridge plate 14a and leg plates 16a, 18a, which are welded together. One recognizes that as a consequence, the arm tip 14 can be used irrespective of the selected way of manufacture of the load arm frame.

In the region of the abutting surfaces and in the snugly sitting region of the arm sections 30, 32, the arm tip 14 is welded together with the frame 12 or 12a, respectively. The frame 12 or 12a, respectively, is made from sheet steel, and the arm tip 14 is formed in cast steel.

Figure 4:
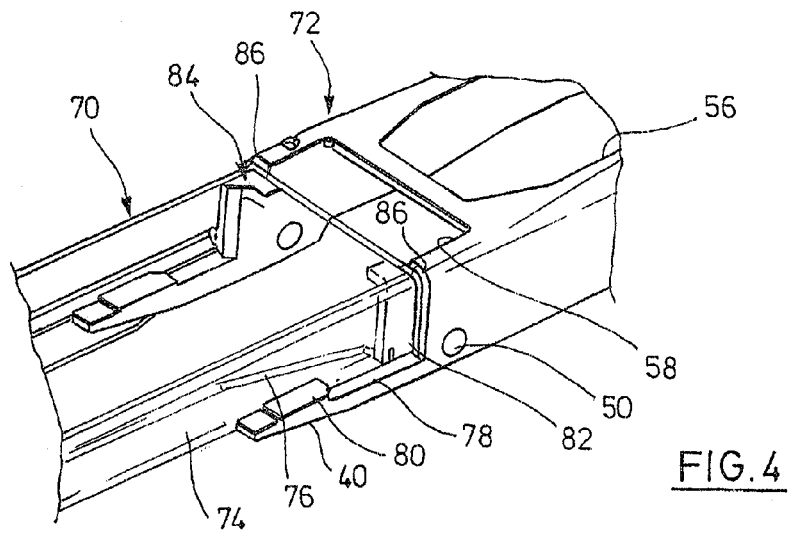
FIG. 4 shows the connection region of an arm frame with an arm tip according to the present invention in a perspective view.
Figure 5:
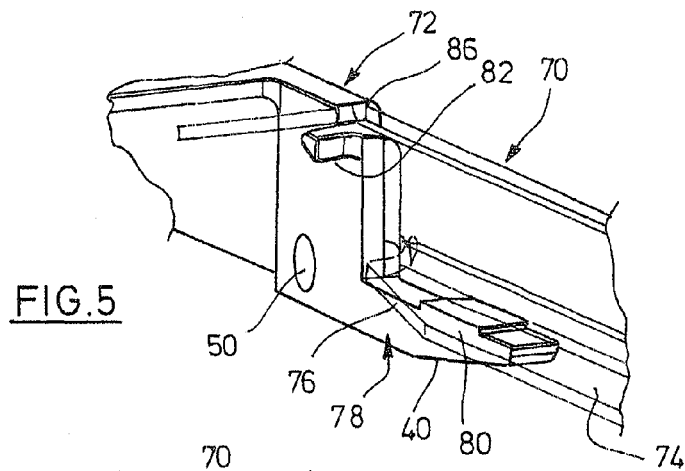
FIG. 5 shows the abutting region of the arm tip with the arm frame according to FIG. 4 at one side of the arm frame, in a perspective view.
Figure 6:
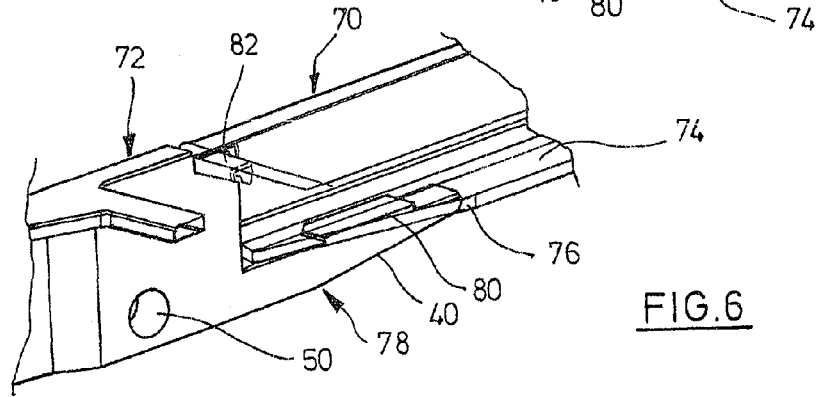
FIG. 6 shows a similar depiction as FIG. 5, but seen from a viewing direction departing from the arm tip.

In FIG. 4 to 6, an arm frame 70 is indicated, which is connected to an arm tip 72. The arm frame 70 is C-shaped in its cross section and therefore it has two brims 74, formed by canting, on its lower side. As indicated at 76, the brims 74 taper towards the arm tip 72, namely linearly. For the rest, the arm frame is 70 is made to be blunt.

Like the arm tip 14 after FIG. 1 to 3, the arm tip 72 has a front recess 56 and a rear recess 58, wherein the rear recess 58 is open towards the arm frame 70.

As can be recognized further, the arm tip 72 has lower arm sections 78 projecting towards the rear side, which extend below the brims 74, similar to the arm sections 40, 42. The lower side of the arm sections 78 is provided with a chamfer 40, like in the embodiment described above, which serves as a facilitating part for withdrawal. The arm sections 78 have a high area 80 with planar upper side, which sits snugly against the lower brim 74 of the arm frame 70.

Above the arm sections 78 and in extension of the side walls of the arm tip 72, angular lugs 82, 84 are formed at a time on the arm tip 72. The outer surface and the upper surface of the lugs 82, 84 is offset towards the inside with respect to the outer sides and the upper side of the arm tip 72, through which a chamfer 86 is formed. The outer and upper sides of the lugs 82, 84 are dimensioned such that the arm frame 70 can be thrust over the lugs 82, 84, as can be recognized in FIG. 4 in particular, wherein upper and outer sides of the lugs 82, 84 come to sit snugly against the inner surfaces of the arm frame 70. The end of the lower brim 74 abuts against the facing end surface of the lugs 82, 84 in this, in order to be welded there. Therefore, the brims 74 end in a distance to the end of the otherwise blunt arm frame 70, wherein the distance has the length of the lug 82, 84. Thus, the chamfer 86 has a width which corresponds to the thickness of the metal sheet of the arm frame 70. Through this, he outer and upper sides of arm tip 72 and arm frame 70 pass over into each other without any step.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A load arm for a fork of a low lift industrial truck, with an arm frame which is approximately U- or C-shaped in cross section with upward pointing bridge and downward pointing legs and an arm tip, which is connected to the arm frame via a welding connection, wherein the arm tip, tapered towards the free end, has bearing openings for the bearing of a load roller and introduction and withdrawal surfaces on the lower side, which ascend or fall off, respectively, towards the free end of the arm tip with respect to the lower edges or brims of the arm frame, and wherein the arm tip has an abutting surface at the rear end, which abuts against the blunt end of the arm frame, characterised in that the arm tip (14) is formed by an integral piece of cast material, the arm tip (14) has arm sections (30, 32) on the end facing the arm frame (12, 12a), which extend below the associated edges or brims of the arm frame and which sit snugly on the lower edges or brims of the arm frame (12, 12a) when arm frame (12, 12a) and arm tip (14) cling together, and that the withdrawal surfaces are provided on the lower side of the arm sections (30, 32), and further characterised in that the abutting surface of the arm tip (72) has a chamfer (86), which is formed in that angular lugs (82, 84) are formed on the rear end of the arm tip (72) in extension of its side walls, the upper and side surfaces of which are offset towards the inside with respect to the outer upper surface and the outer side surfaces of the arm tip (72) and which sit snugly against the inner surfaces of the arm frame (70), which is thrusted over the lugs (82, 84) sitting snugly to the chamfer (86).

2. A load arm according to claim 1, characterised in that the cross section of the arm frame (70) is C-shaped and the bent lower brims (74) of the arm frame (70) near the arm tip (72) taper towards the same, and the end of the lower brims (74) sits snugly against the end surface of the lugs (82, 84).

* * * * *